US012233008B2

(12) United States Patent
Drew et al.

(10) Patent No.: US 12,233,008 B2
(45) Date of Patent: Feb. 25, 2025

(54) CASKET HARDWARE ATTACHMENT STRUCTURE

(71) Applicant: Batesville Services, Inc., Batesville, IN (US)

(72) Inventors: Travis Drew, Batesville, IN (US); Ilija Rojdev, Cincinnati, OH (US); Greg Wray, Guilford, IN (US)

(73) Assignee: Batesville Services, LLC, Batesville, IN (US)

( * ) Notice: Subject to any disclaimer, the term of this patent is extended or adjusted under 35 U.S.C. 154(b) by 0 days.

(21) Appl. No.: 18/480,889

(22) Filed: Oct. 4, 2023

(65) Prior Publication Data

US 2024/0050301 A1 Feb. 15, 2024

Related U.S. Application Data

(62) Division of application No. 17/374,375, filed on Jul. 13, 2021, now Pat. No. 11,813,208, which is a division of application No. 16/594,484, filed on Oct. 7, 2019, now Pat. No. 11,160,712, which is a division of application No. 15/383,997, filed on Dec. 19, 2016, now Pat. No. 10,434,026, which is a division of application No. 14/453,132, filed on Aug. 6, 2014, now Pat. No. 9,522,093.

(60) Provisional application No. 61/863,713, filed on Aug. 8, 2013.

(51) Int. Cl.

| | |
|---|---|
| ***A61G 17/04*** | (2006.01) |
| ***A61G 99/00*** | (2006.01) |

(52) U.S. Cl.
CPC ............ *A61G 17/041* (2016.11); *A61G 17/04* (2013.01); *A61G 17/0407* (2017.05); *A61G 99/00* (2013.01)

(58) Field of Classification Search
CPC .. A61G 17/0407; A61G 17/041; A61G 17/04; A61G 99/00; A47B 95/02
See application file for complete search history.

(56) References Cited

U.S. PATENT DOCUMENTS

| | | | | |
|---|---|---|---|---|
| 958,114 | A * | 5/1910 | Hammond ............. | A47B 95/02 16/439 |
| 1,185,655 | A | 6/1916 | Govro | |
| 1,227,929 | A | 5/1917 | Ralston | |
| 2,023,211 | A * | 12/1935 | Scholl .................... | A47B 95/02 16/439 |
| 2,330,141 | A | 9/1943 | Olson | |
| 3,204,286 | A | 9/1965 | Hillenbrand | |
| 4,077,096 | A | 3/1978 | Christian | |
| 4,615,085 | A | 10/1986 | Hartman | |

(Continued)

*Primary Examiner* — William L Miller
(74) *Attorney, Agent, or Firm* — Dinsmore & Shohl LLP

(57) ABSTRACT

Hardware for a casket comprises a clevis having a pair of side walls, a back wall adapted to be attached to the casket shell wall, a pair of tabs each of which extends laterally outwardly from a respective one of the side walls and each of which is spaced forwardly from the rear wall, an arm pivoted at an upper end to the clevis, and a decorative ear having a downwardly facing recess in a lower edge thereof and a pair of tapered resilient arms each of which is located on a respective side of the recess, each resilient arm having a laterally inwardly projecting tab on a lower free end thereof, each resilient arm becoming progressively thicker from the free end toward a base thereof as measured in a direction generally normal to the casket shell wall.

3 Claims, 20 Drawing Sheets

(56) References Cited

U.S. PATENT DOCUMENTS

| | | | |
|---|---|---|---|
| 5,008,990 | A | 4/1991 | Craft |
| 5,144,727 | A | 9/1992 | Craft |
| 5,241,729 | A | 9/1993 | MacKirdy |
| 5,309,614 | A | 5/1994 | MacKirdy |
| 5,335,402 | A | 8/1994 | Semon |
| 5,377,395 | A | 1/1995 | Maier |
| 5,463,800 | A | 11/1995 | Rojdev |
| 5,519,923 | A | 5/1996 | Rojdev |
| 5,604,965 | A | 2/1997 | Shaw et al. |
| 5,898,980 | A | 5/1999 | Havranek et al. |
| 6,499,193 | B1 | 12/2002 | Robert |
| 6,754,940 | B1 | 6/2004 | Boots |
| 7,308,742 | B2 | 12/2007 | Schultz |
| 9,522,093 | B2 | 12/2016 | Drew et al. |
| 10,434,026 | B2 | 10/2019 | Drew et al. |
| 2009/0113679 | A1 | 5/2009 | Malcomb et al. |

* cited by examiner

CASKET HARDWARE ATTACHMENT STRUCTURE

CROSS-REFERENCE TO RELATED APPLICATIONS

This application is a divisional of U.S. patent application Ser. No. 17/374,375 filed Jul. 13, 2021, which is a divisional of U.S. patent application Ser. No. 16/594,484 filed Oct. 7, 2019, now U.S. Pat. No. 11,160,712 issued Nov. 2, 2021, which is a divisional of U.S. patent application Ser. No. 15/383,997 filed Dec. 12, 2016, now U.S. Pat. No. 10,434,026 issued Oct. 8, 2019, which is a divisional of U.S. patent application Ser. No. 14/453,132 filed Aug. 6, 2014, now U.S. Pat. No. 9,522,093 issued Dec. 20, 2016, which claims the priority benefit of U.S. Provisional Patent Application No. 61/863,713 filed Aug. 8, 2013, all of which are hereby incorporated by reference herein as if fully set forth in their entirety.

TECHNICAL FIELD

This invention relates generally to caskets, and more particularly to structure for attaching ornaments to caskets.

BACKGROUND

A conventional casket has a casket shell adapted to contain the deceased, and one or two lids or caps pivotally attached to the shell. Each side wall (and sometimes each end wall) of the casket shell has a number of arms attached thereto and spaced along the length thereof, the free ends of which are attached to an elongated handle bar for carrying the casket.

The upper end of each arm is pivotally attached to a clevis, which clevis is attached to the side wall of the casket shell via a fastener such as a bolt and nut. Decorative hardware, often referred to as an "ear" or "escutcheon", or a "lug" or "plate", is attached to the casket shell wall to conceal the connection of the arm to the wall. As used herein, the term "ear" shall be deemed to generically embrace "ear", "escutcheon", "lug", and "plate". Such decorative "hardware" was originally and for many years has been fabricated of metal. With the advent of plastics technology in more recent years, decorative "hardware" may just as likely be fabricated of plastic as metal. As used herein, the term "hardware" shall be deemed to generically embrace the above mentioned decorative structures, whether fabricated of metal or plastic. It is also known to attach decorative ornaments to the corners of the casket shell. As used herein, the term "hardware" shall also be deemed to generically embrace such ornaments, regardless of the material of manufacture.

Various structures have been proposed over the years for quickly and securely attaching ears and corner ornaments to the casket shell walls. Nevertheless, there remains room for improvement.

SUMMARY

In one aspect, hardware adapted to be attached to a wall of a casket shell of a casket is provided. The hardware comprises a clevis having a pair of side walls and a back wall adapted to be attached to the casket shell wall, the clevis having a pair of tabs each of which extends laterally outwardly from a respective one of the side walls of the clevis and each of which is spaced forwardly from the rear wall of the clevis, an arm pivoted at an upper end to the clevis, and a decorative ear having a downwardly facing recess in a lower edge thereof and a pair of tapered resilient arms each of which is located on a respective side of the recess, each resilient arm having a laterally inwardly projecting tab on a lower free end thereof, each resilient arm becoming progressively thicker from the free end toward a base thereof as measured in a direction generally normal to the casket shell wall. Initial downward movement of the ear relative to the clevis causes the resilient arms to pass between the clevis tabs and the casket shell wall; further downward movement of the ear relative to the clevis causes a wedging effect of the clevis tabs on the arms to snug the ear generally horizontally rearwardly against the casket shell wall; and yet further downward movement of the ear relative to the clevis causes the tabs on the resilient arms to snap inwardly below respective lower edges of respective ones of the side walls of the clevis to restrain the ear against generally vertical movement relative to the clevis and to locate the ear laterally relative to the clevis.

Each resilient arm can have a recess in a forward surface thereof which receives a respective one of the clevis tabs.

In another aspect, hardware comprises a clevis having a pair of side walls and a back wall adapted to be attached to the casket shell wall, the clevis having a pair of tabs each of which extends laterally outwardly from a respective one of the side walls of the clevis and each of which is spaced forwardly from said rear wall of the clevis, an arm pivoted at an upper end to the clevis, and a decorative ear having a downwardly facing recess in a lower edge thereof and a first and second pairs of resilient tabs, each tab of the first and second pairs of tabs located on a respective side of the recess, the tabs projecting laterally inwardly, the ear having a partial back wall section extending laterally inwardly from each side of the recess, each partial back wall section becoming progressively thinner from a point laterally inward of a respective side of the recess to a free edge thereof as measured in a direction generally normal to the casket shell wall. Initial downward movement of the ear relative to the clevis causes the partial back wall sections to pass between the clevis tabs and the casket shell wall; further downward movement of the ear relative to the clevis causes a wedging effect of the clevis tabs on the partial back wall sections to snug the ear generally horizontally rearwardly against the casket shell wall; yet further downward movement of the ear relative to the clevis causes a lowermost pair of the first and second pairs of tabs to snap inwardly below respective lower edges of respective ones of the side walls of the clevis to restrain the ear against generally vertical movement relative to the clevis, free edges of an uppermost pair of the first and second pairs of tabs abutting respective ones of the side walls to locate the ear laterally relative to the clevis.

The hardware can further comprise a third pair of resilient tabs located between the lowermost pair and the uppermost pair, free edges of which abut respective ones of the side walls of the clevis to locate the ear laterally. Each of the lowermost pair of tabs can be generally planar and have a thickness dimension measured in a vertical direction. Each of the lowermost pair of tabs can be generally planar and have a thickness dimension measured in a direction generally normal to the casket shell wall. Each of the lowermost pair of tabs can be a cantilever beam projecting laterally inwardly and upwardly. Each of the lowermost pair of tabs can be generally planar, having a thickness dimension measured in a vertical direction, and can be bisected by a laterally oriented cylinder, one half of which extends above the tab and the other half of which extends below the tab, and each side wall of the clevis can have a recess extending from a rear side forwardly, whereby the lowermost pair of tabs and cylinders snap forwardly into the recesses of the clevis.

In another aspect, hardware comprises a clevis having a pair of side walls and a back wall adapted to be attached to the casket shell wall, the clevis having a pair of tabs each of which extends laterally outwardly from a respective one of the side walls of the clevis and each of which is spaced forwardly from the rear wall of the clevis, an arm pivoted at an upper end to the clevis, and a decorative ear having a downwardly facing recess in a lower edge thereof and a pair of generally horizontally oriented grooves each of which is located in a respective side of the recess, the ear having a partial back wall section extending laterally inwardly from each side of the recess, each partial back wall section becoming progressively thinner from a point laterally inward of a respective side of the recess to a free edge thereof as measured in a direction generally normal to the casket shell wall, each sidewall of the clevis having a generally horizontally oriented rib extending laterally outwardly from the side wall. Initial downward movement of the ear relative to the clevis causes the partial back wall sections to pass between the clevis tabs and the casket shell wall; further downward movement of the ear relative to the clevis causes a wedging effect of the clevis tabs on the partial back wall sections to snug the ear generally horizontally rearwardly against the casket shell wall; yet further downward movement of the ear relative to the clevis causes the ribs on the clevis to snap into the grooves in the ear to restrain the ear against generally vertical movement relative to the clevis and to locate the ear laterally relative to the clevis.

The various structure for snugging the ear generally horizontally rearwardly against the casket shell wall, for restraining the ear against generally vertical movement relative to the clevis, and for locating the ear laterally relative to the clevis can be fabricated integrally with the ear as a unitary one-piece part. For example, the structure and ear can be fabricated of plastic. The various structure for snugging the ear generally horizontally rearwardly against the casket shell wall, for restraining the ear against generally vertical movement relative to the clevis, and for locating the ear laterally relative to the clevis can be fabricated separately from the ear as an insert for the ear, the ear having a recess for receiving the insert. For example, the ear can be fabricated of wood and the insert can be fabricated of plastic.

In another aspect, hardware comprises a clevis having a pair of side walls and a back wall, the back wall adapted to be attached to the casket shell wall, a decorative ornament, means for snugging the ornament generally horizontally rearwardly against the casket shell wall, means for restraining the ornament against generally vertical movement relative to the clevis, and means for locating the ornament laterally relative to the clevis.

The ornament can be an ear or a corner ornament.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION

Figure 1:
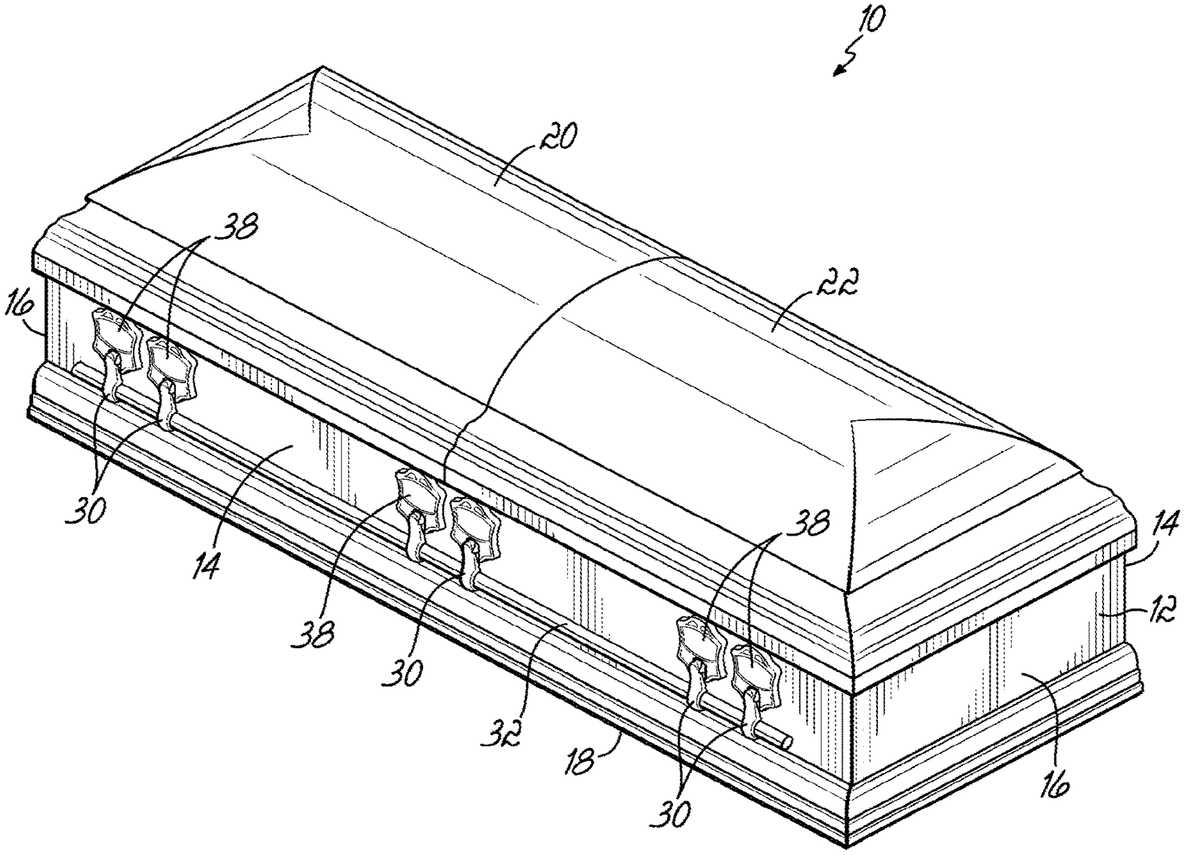
FIG. 1 is a perspective view of a casket according to the principles of the present invention.
Figure 2:
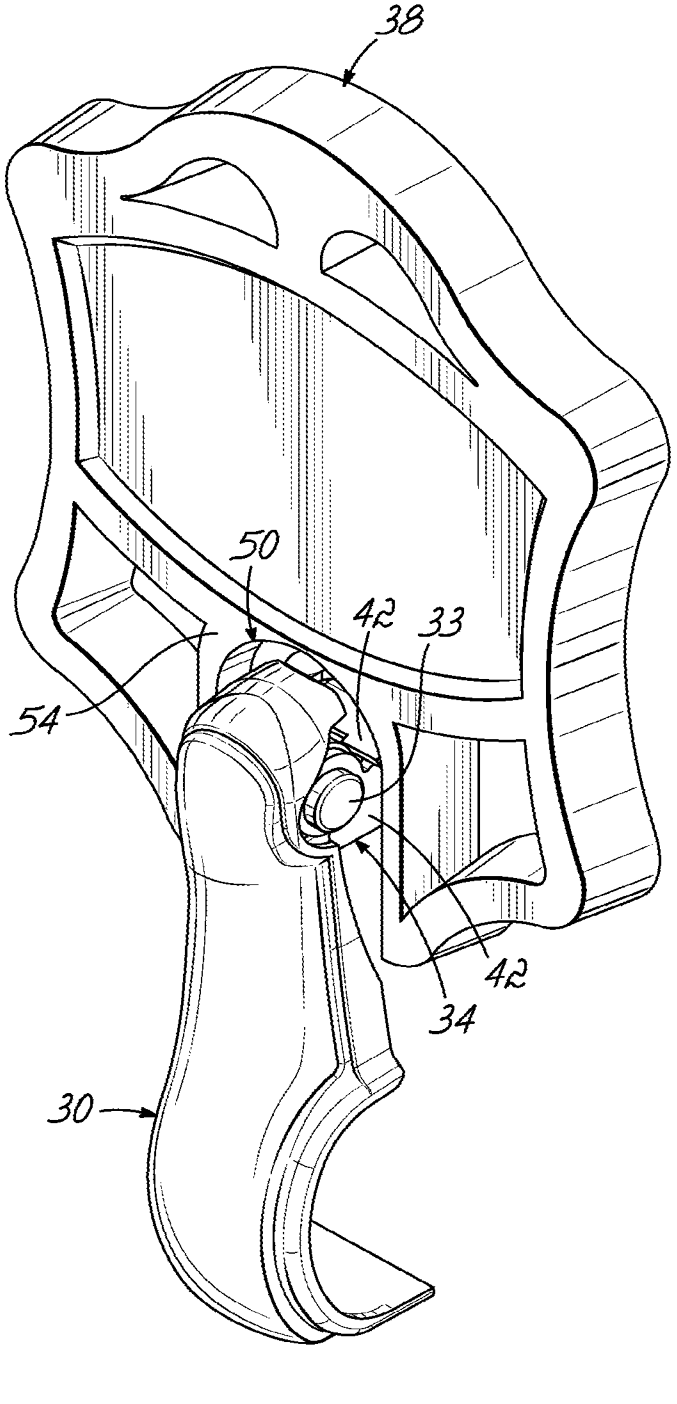
FIG. 2 is an enlarged front perspective view of an arm and ear of FIG. 1.

Referring to FIGS. 1-3D, a casket 10 has a shell 12 adapted to receive the remains of a deceased having a pair of side walls 14, 14, a pair of end walls 16, 16, a bottom wall 18, and a pair of caps 20, 22 closable on the shell 12. The casket 10 may have a pair of caps as illustrated or a single cap the full length of the casket 10. A plurality of arms 30 are attached to the shell wall, e.g. side wall 14 or end wall 16. The lower ends of the arms 30 are attached to an elongated handle bar 32, and the upper ends of the arms 30 are pivoted at 33 to a clevis 34, which itself is attached to the shell wall with fasteners, e.g. bolts 36 and nuts (not shown). A decorative ear 38 is attached to the clevis 34 and conceals the bolted connection of the clevis 34 to the shell wall. Directional terms as used herein—for example up, down, right, left, front, back, top, bottom—are made only with reference to the figures as drawn and are not intended to imply absolute orientation.

Clevis 34 has a back wall 40, a pair of side walls 42, 42, and a pair of tabs 44, 44 which extend laterally outwardly from the side walls 42, 42. The rear sides of the clevis tabs 44, 44 are spaced forwardly from the rear side of the back wall 40 of the clevis 34.

Ear 38 is preferably fabricated of a material having some resilience to it, e.g. plastic, and has a downwardly facing recess 50 in a lower edge thereof. Each of a pair of tapered resilient arms 52, 52 is located on a respective side 54 of the recess 50. Each resilient arm 52 has a laterally inwardly projecting tab 56 on a lower free end 58 thereof. Each resilient arm 52 becomes progressively thicker from its free end 58 toward its base 60, as measured in a direction generally normal to the shell wall.

Figure 3A:
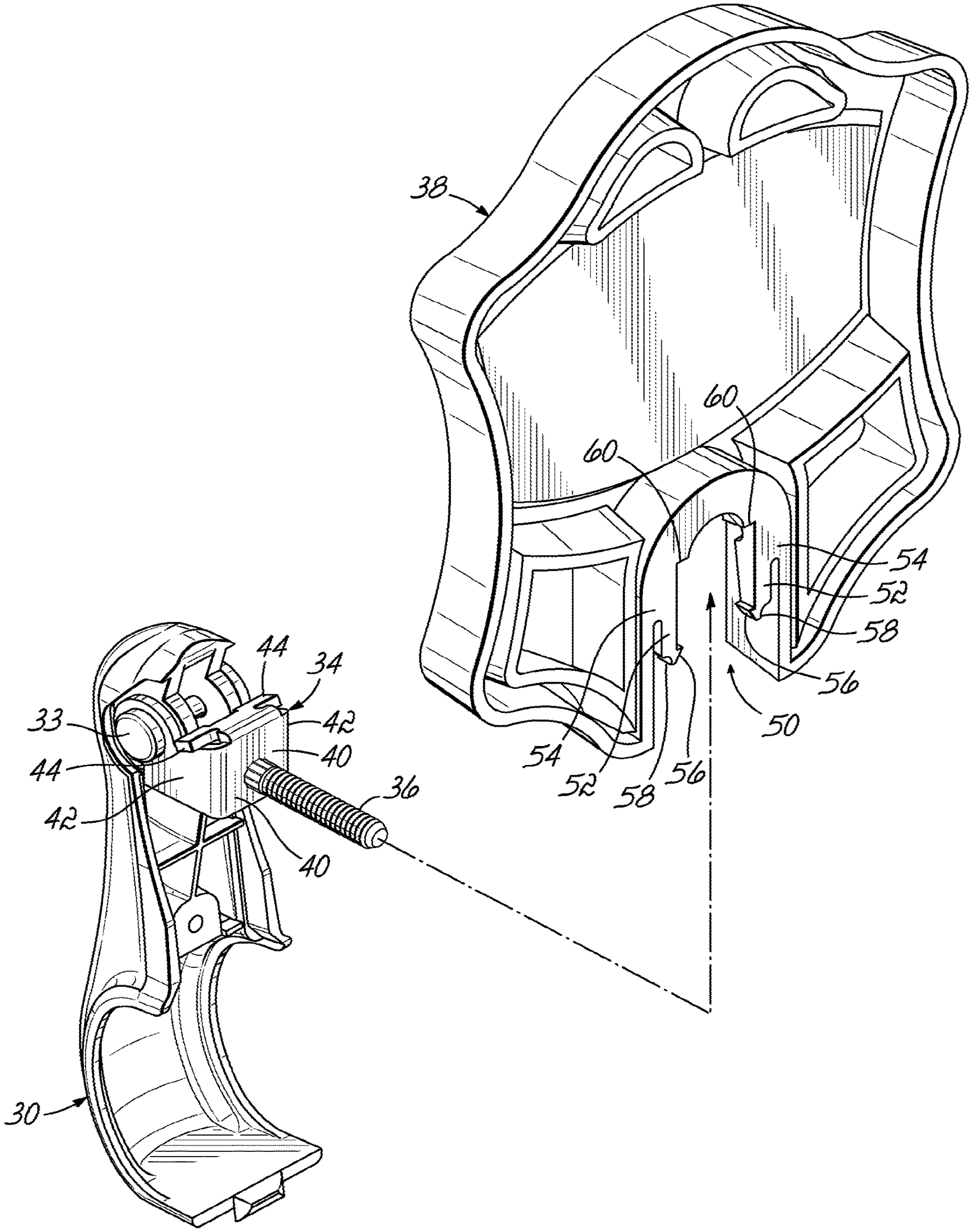
FIG. 3A is a disassembled rear perspective view of the arm and ear of FIG. 2.
Figure 3B:
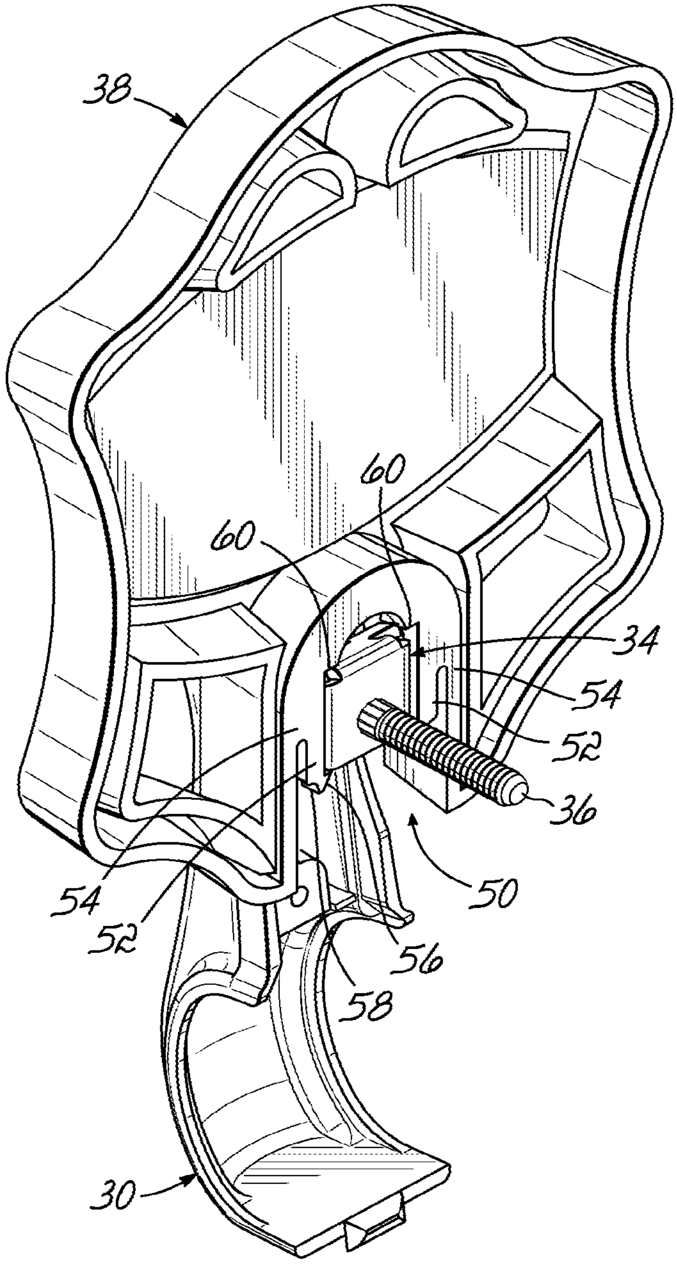
FIG. 3B is an assembled rear perspective view thereof.
Figure 3C:
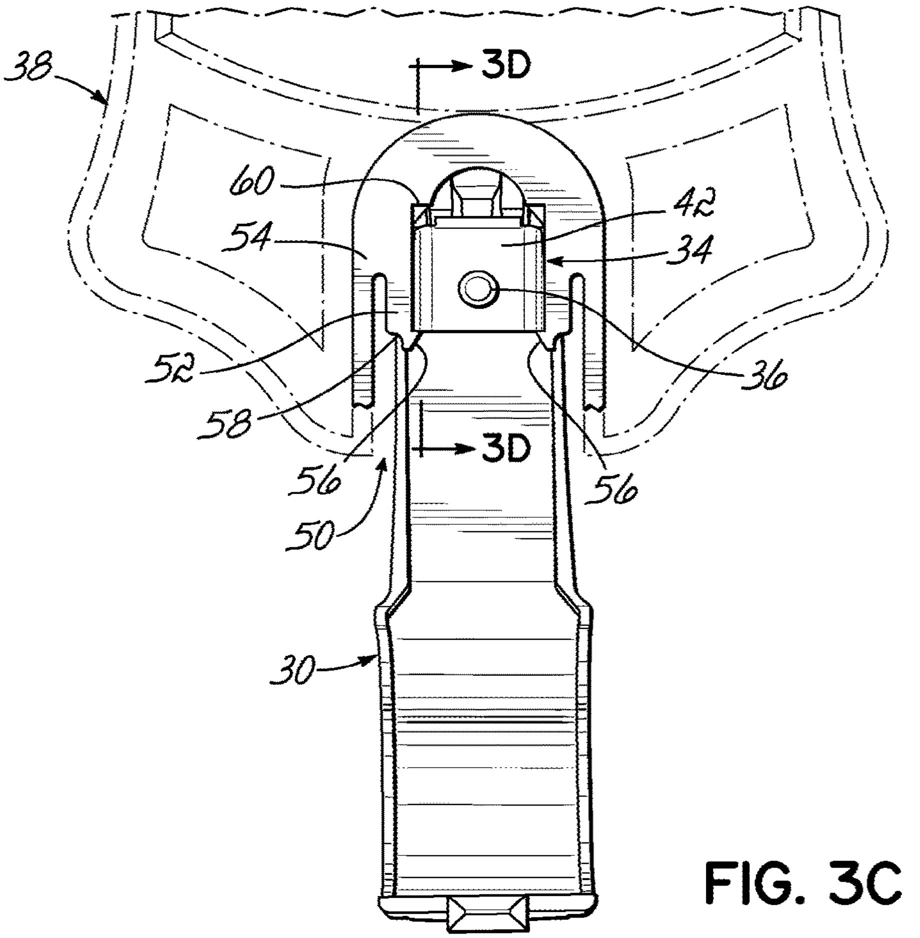
FIG. 3C is a rear view thereof.
Figure 3D:
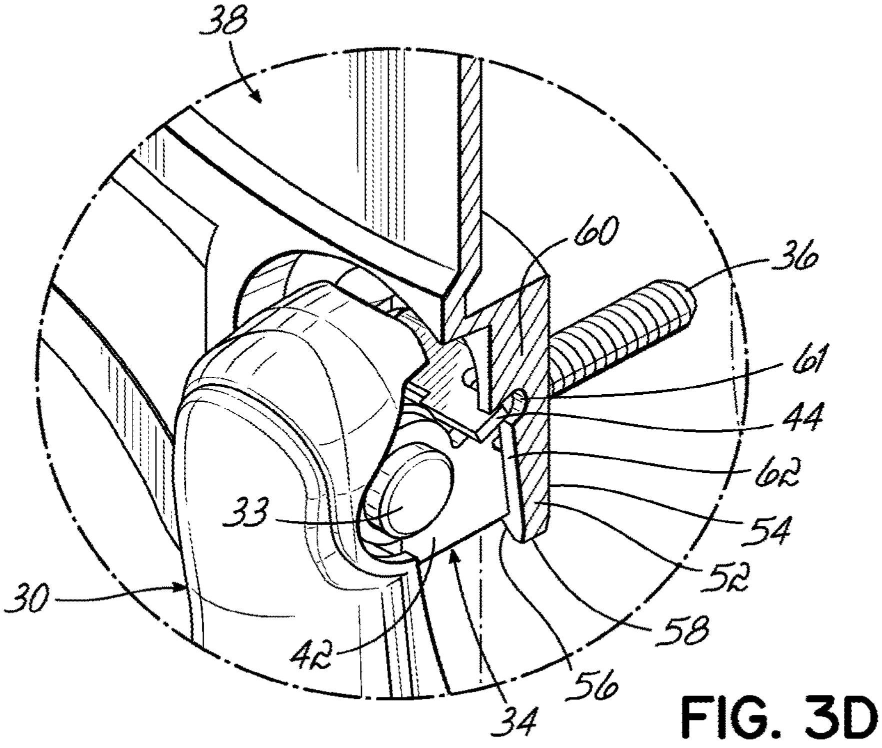
FIG. 3D is a cross-sectional view taken along line 3D-3D in FIG. 3C.

To attach the ear 38 to the casket shell 12, the recess 50 is centered over the clevis 34, with the ear 38 against the shell wall. The ear 38 is then moved downwardly such that the resilient arms 52, 52 pass between the clevis tabs 44, 44 and the shell wall. Further downward movement of the ear 38 relative to the clevis 34 causes a wedging effect of the clevis tabs 44, 44 on the resilient arms 52, 52 due to the increasing thickness of the arms 52, 52, thereby snugging the ear 38 generally horizontally rearwardly and against the shell wall. Still further downward movement of the ear 38 relative to the clevis 34 causes the tabs 56, 56 to snap inwardly below the lower edges of the side walls 42, 42 of the clevis 34 thereby restraining the ear 38 against generally vertical movement relative to the clevis 34 and also locating the ear 38 laterally relative to the clevis 34. Referring to FIG. 3D, each resilient arm 52 can have a recess 61 in a forward surface 62 thereof for receiving clevis tab 44, thereby providing additional security against vertical movement of the ear 38.

Figure 4A:
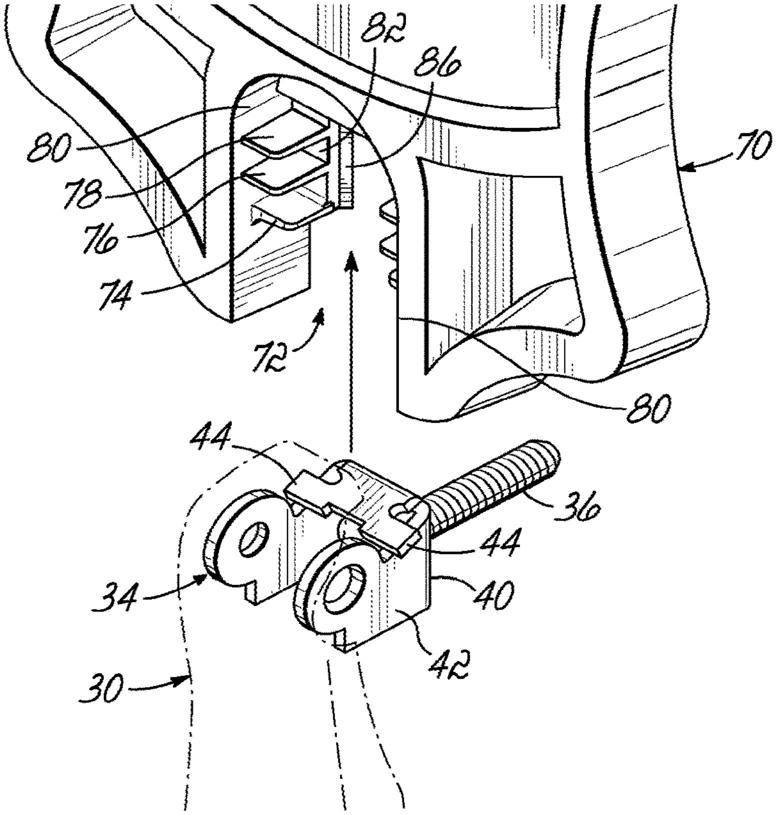
FIG. 4A is a disassembled front perspective view of another embodiment of arm and ear according to the principles of the present invention.
Figure 4B:
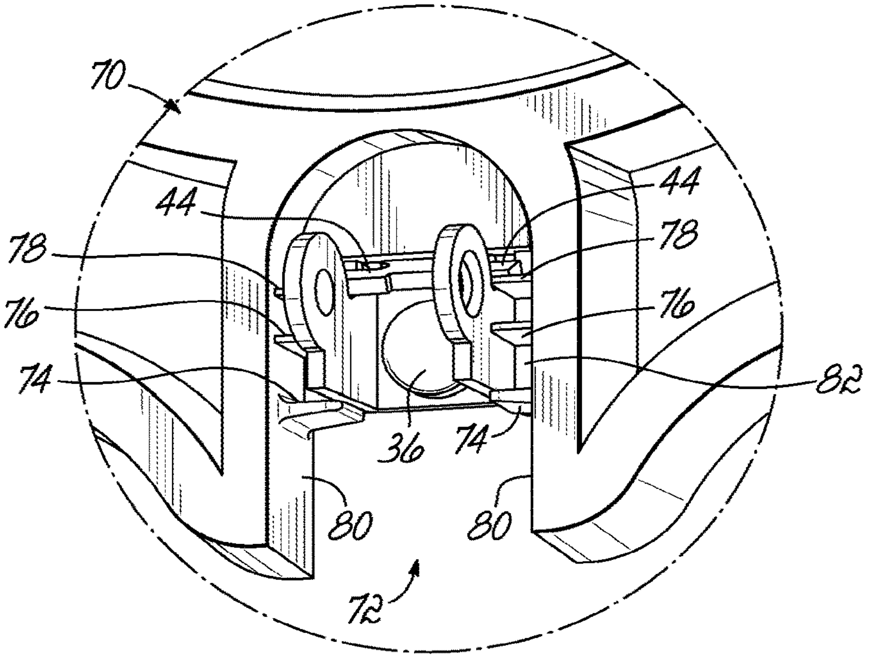
FIG. 4B an assembled front perspective view thereof.

Referring to FIGS. 4A and 4B, and with like numbers indicating like elements, ear 70 has a downwardly facing recess 72 in a lower edge thereof. Each tab of three pairs of resilient tabs 74, 74, 76, 76, and 78, 78 is located on a respective side 80 of the recess 72. The ear 70 also has a partial back wall section 82 extending laterally inwardly from each side 80 of the recess 72. Each partial back wall section 82 becomes progressively thinner from a point laterally inward of a side 80 of the recess 72 (e.g. at or about the laterally inward edge of tabs 74, 76, 78) laterally inwardly to a free edge 86 thereof, as measured in a direction generally normal to the shell wall.

To attach the ear 70 to the casket shell 12, the recess 72 is centered over the clevis 34, with the ear 70 against the shell wall. The ear 70 is then moved downwardly such that the partial back wall sections 82, 82 pass between the clevis tabs 44, 44 and the shell wall. Further downward movement of the ear 70 relative to the clevis 34 causes a wedging effect of the clevis tabs 44, 44 on the free edges 86, 86 of the partial back wall sections 82, 82 thereby snugging the ear 70 generally horizontally rearwardly against the shell wall. Still further downward movement of the ear 70 relative to the clevis 34 causes the lowermost pair of tabs 74, 74 to snap inwardly below the lower edges of the side walls 42, 42 of the clevis 34 thereby restraining the ear 70 against generally vertical movement relative to the clevis 34. The free edges of the upper two pairs of tabs 76, 76 and 78, 78 abut the side walls 42, 42 of the clevis 34 thereby locating the ear laterally relative to the clevis.

As shown in FIGS. 4A and 4B, each of the pairs of tabs 74, 74, 76, 76, and 78, 78 can be connected to the sides 80 of the recess 72 and/or the partial back wall sections 82. Each of the lowermost pair of tabs 74, 74 is generally planar and has a thickness dimension measured in the vertical direction.

As shown in FIGS. 5A-5D, and with like numbers indicating like elements, the lowermost pair of tabs 74*a*, 74*a* are also generally planar, but have a thickness dimension measured in the direction generally normal to the shell wall, and are connected to the sides 80 of the recess 72. The lowermost pair of tabs 74*a*, 74*a* are thus stiffer than the lowermost pair of tabs 74, 74 shown in FIGS. 4A and 4B. With tabs 74*a*, 74*a*, the resilience for the tabs snapping inwardly below the lower edges of the side walls 42, 42 of the clevis 34 is more from the body of the ear 70 than from the tabs 74*a*, 74*a*. Installation onto the shell wall is similar to that of FIGS. 4A and 4B.

Figure 5A:
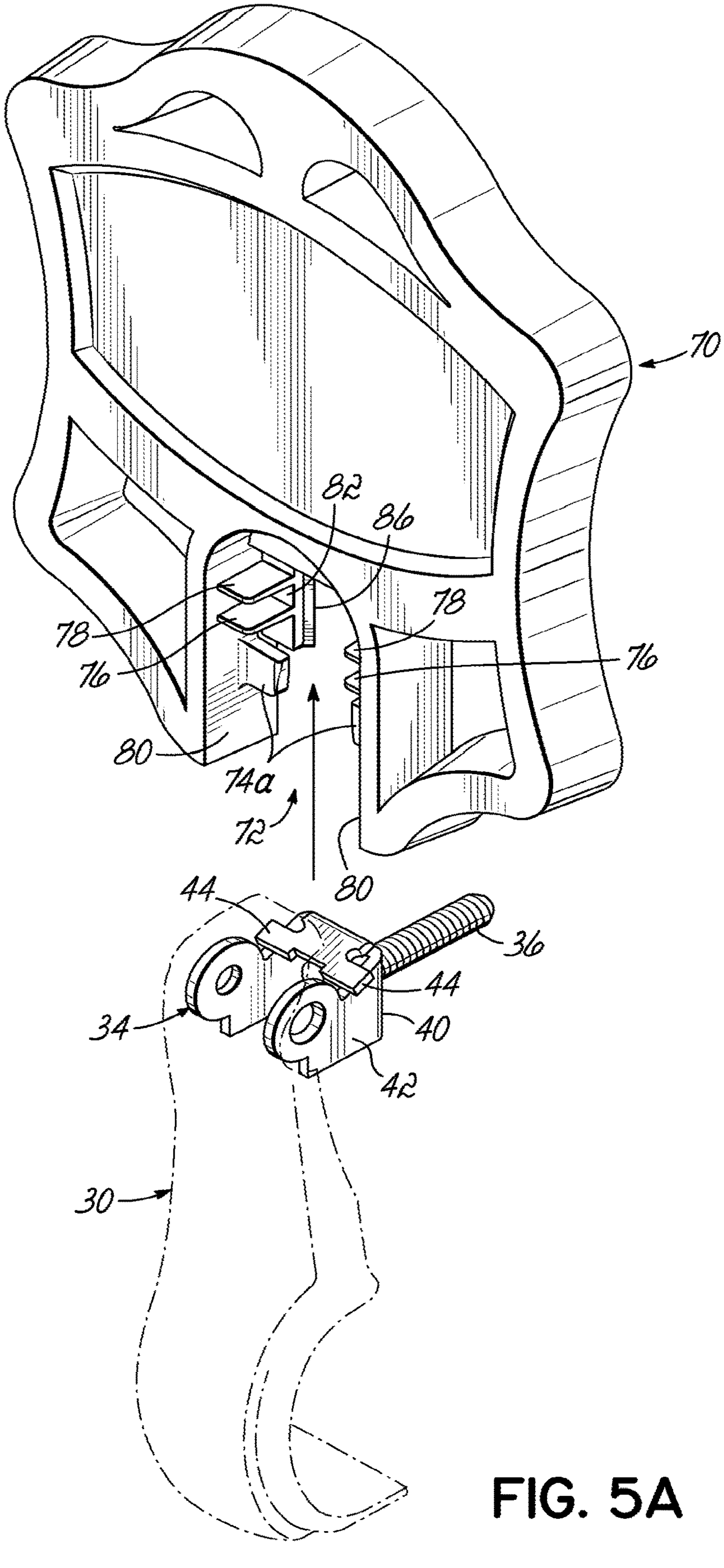
FIG. 5A is a disassembled front perspective view of another embodiment of arm and ear according to the principles of the present invention.
Figure 5B:
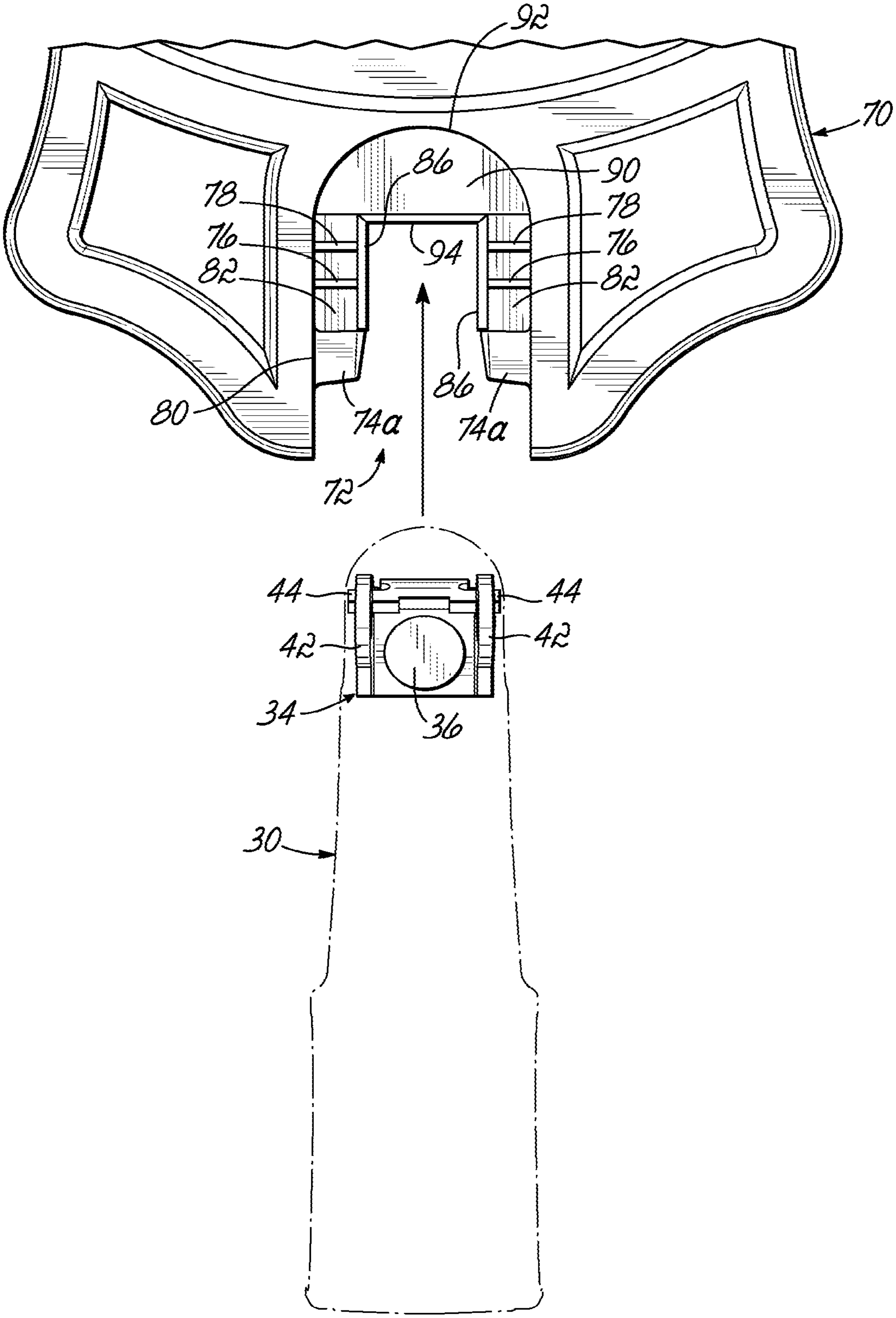
FIG. 5B is a disassembled front view thereof.
Figure 5C:
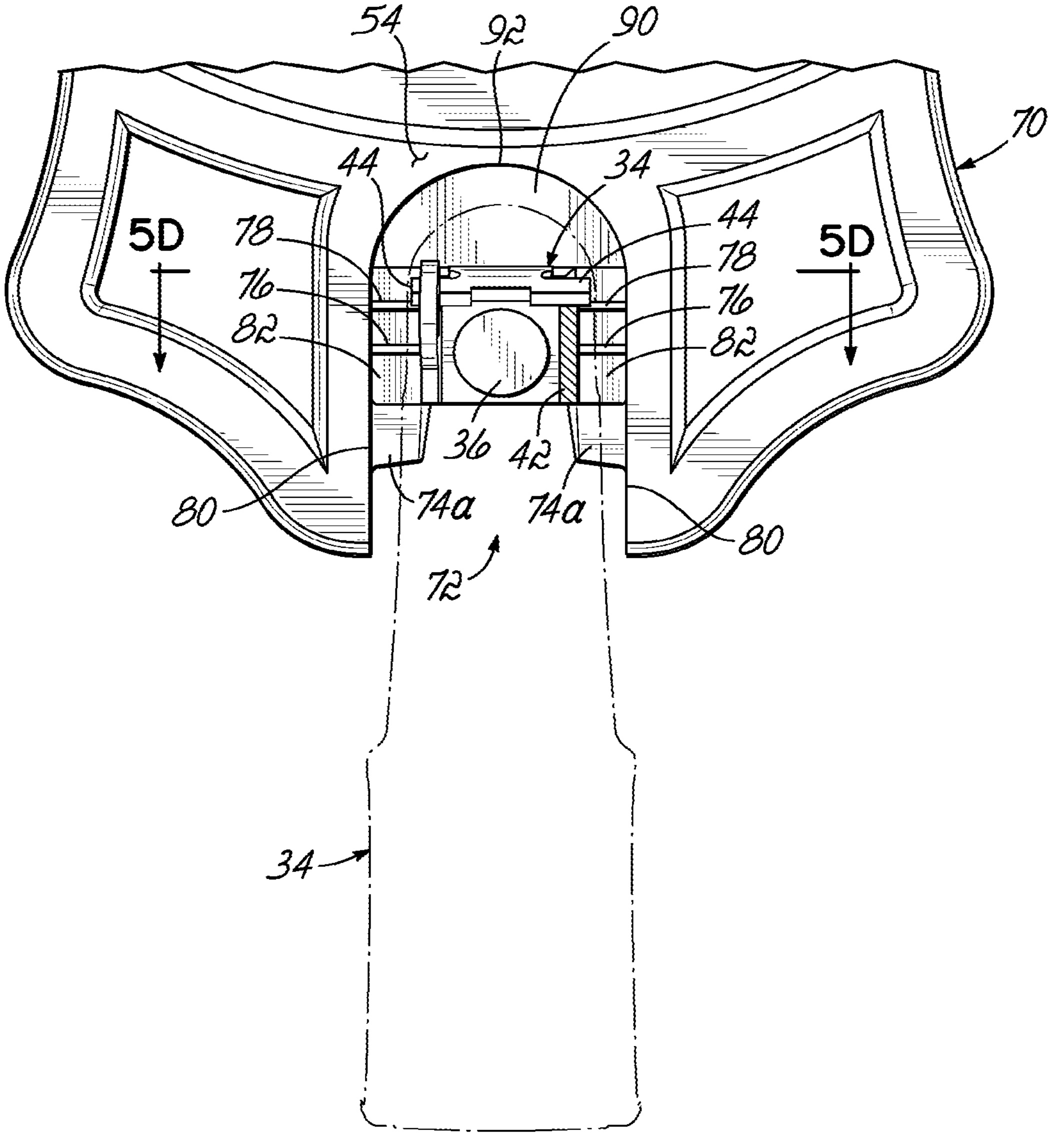
FIG. 5C is an assembled front view thereof.
Figure 5D:
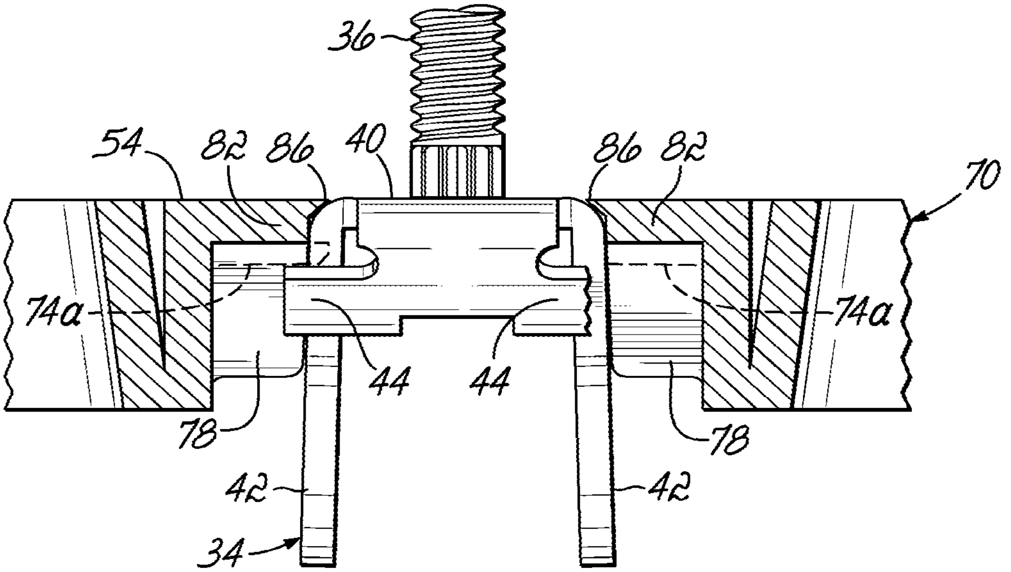
FIG. 5D is a view taken along the line 5D-5D in FIG. 5C.
Figure 5E:
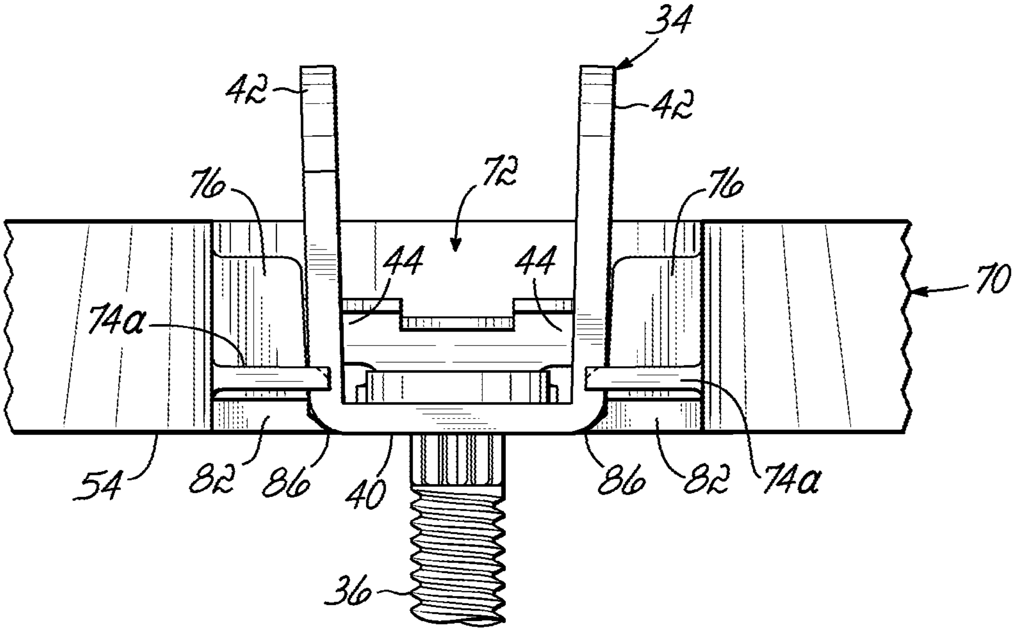
FIG. 5E is a bottom view thereof.

Also as shown in FIG. 5B, ears 38 and/or 70 can also have a top partial back wall section 90, in addition to the side partial back wall sections 82. Top partial back wall section 90 can also be progressively thinner from a point below a top 92 of the recess 72 downwardly to a free edge 94 thereof, as measured in a direction generally normal to the shell wall, to further snug the ear against the shell wall.

Figure 6A:
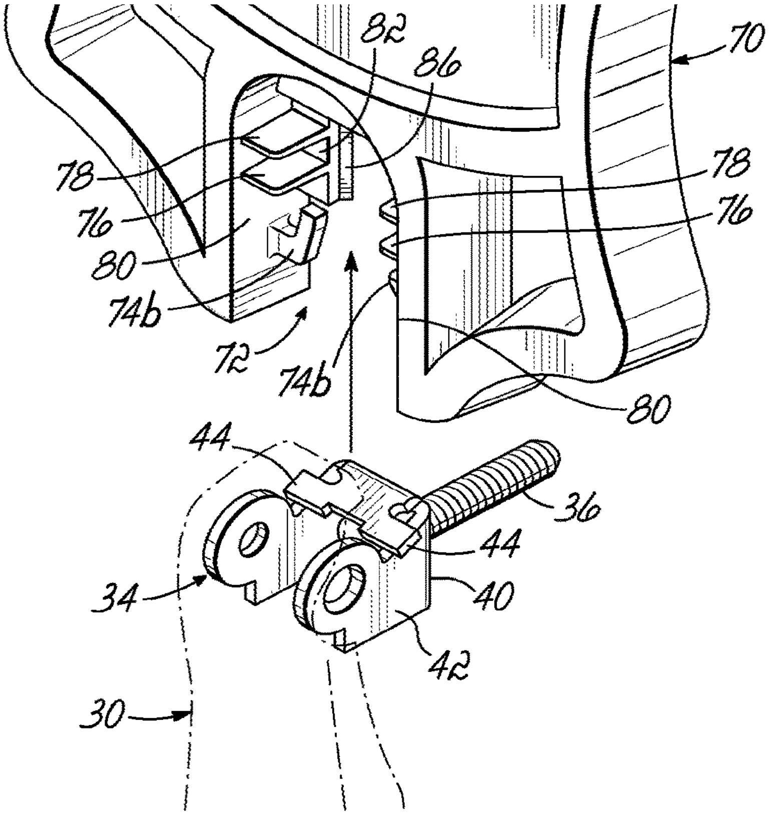
FIG. 6A is a disassembled front perspective view of another embodiment of arm and ear according to the principles of the present invention.
Figure 6B:
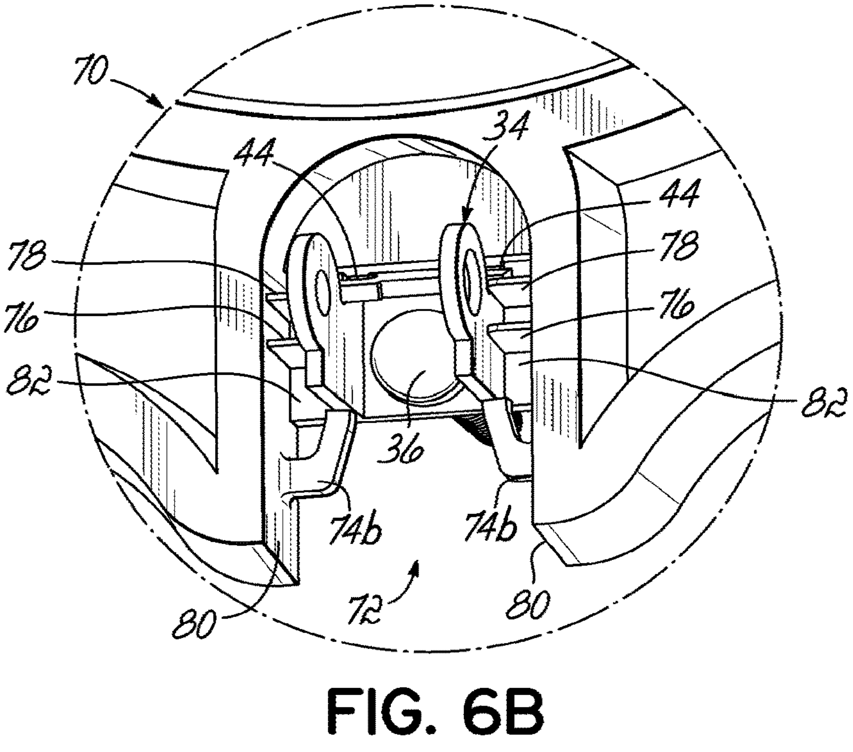
FIG. 6B is an assembled front view thereof.

As shown in FIGS. 6A and 6B, and with like numbers indicating like elements, the lowermost pair of tabs 74*b*, 74*b* are cantilever beams projecting laterally inwardly and upwardly from the sides 80 of the recess 72. Installation onto the shell wall is similar to that of FIGS. 4A and 4B, and 5A and 5B.

Figure 7A:
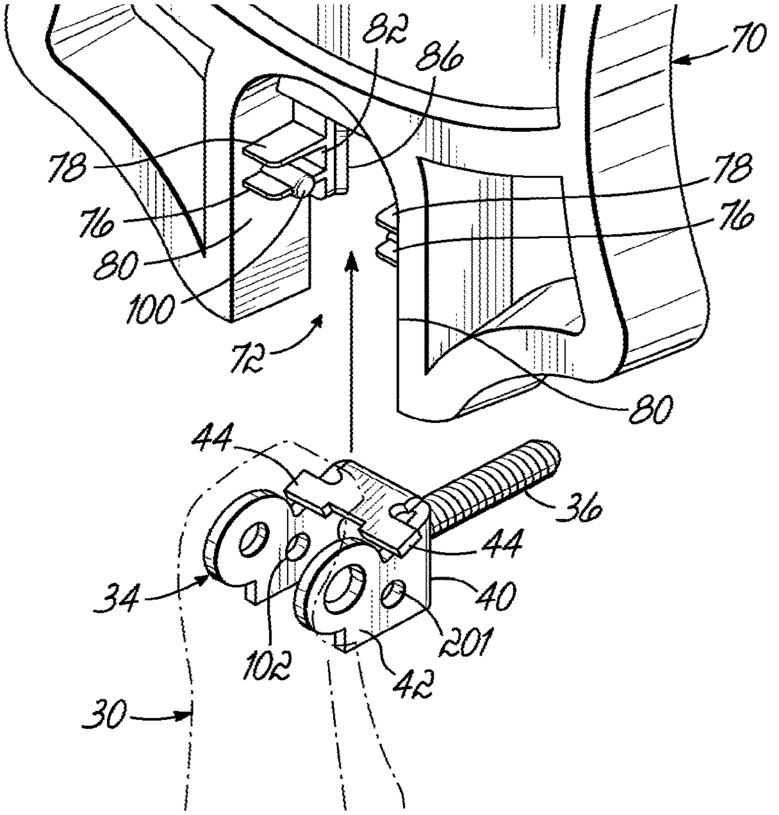
FIG. 7A is a disassembled front perspective view of another embodiment of arm and ear according to the principles of the present invention.
Figure 7B:
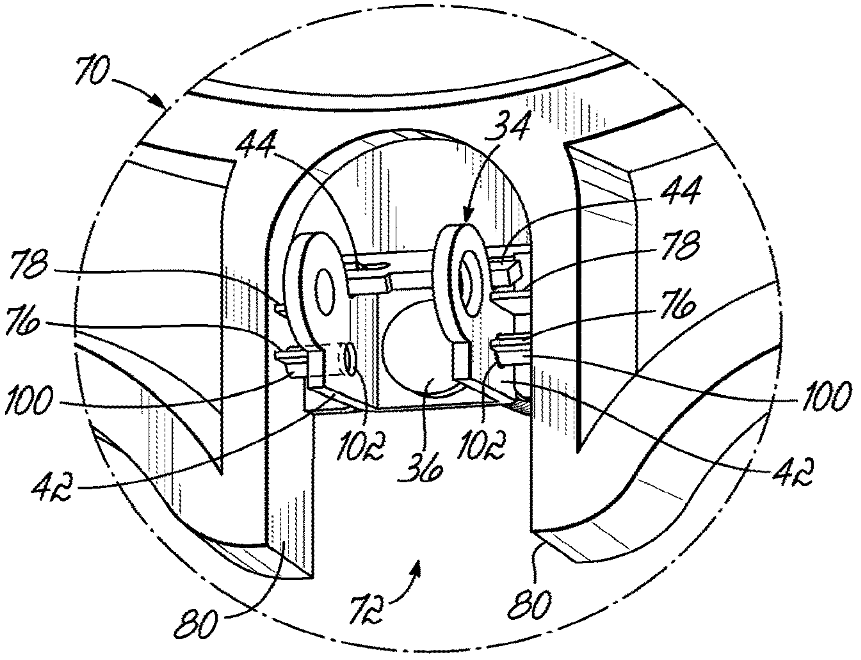
FIG. 7B is an assembled front perspective view thereof.

As shown in FIGS. 7A and 7B, and with like numbers indicating like elements, the lowermost pair of tabs 76*a*, 76*a* can be generally planar, having a thickness dimension measured in a vertical direction, and can be bisected by a laterally oriented cylinder 100, one half of which extends above the tab 76*a* and the other half of which extends below the tab 76*a*. Each side wall 42 of the clevis 34 can have a recess 102 extending from a rear side forwardly, whereby the lowermost pair of tabs 76*a*, 76*a* and cylinders 100, 100 snap forwardly into the recesses 102, 102 of the clevis 34. Installation onto the shell wall is similar to that of FIGS. 4A and 4B, 5A and 5B, and 6A and 6B.

Figure 8A:
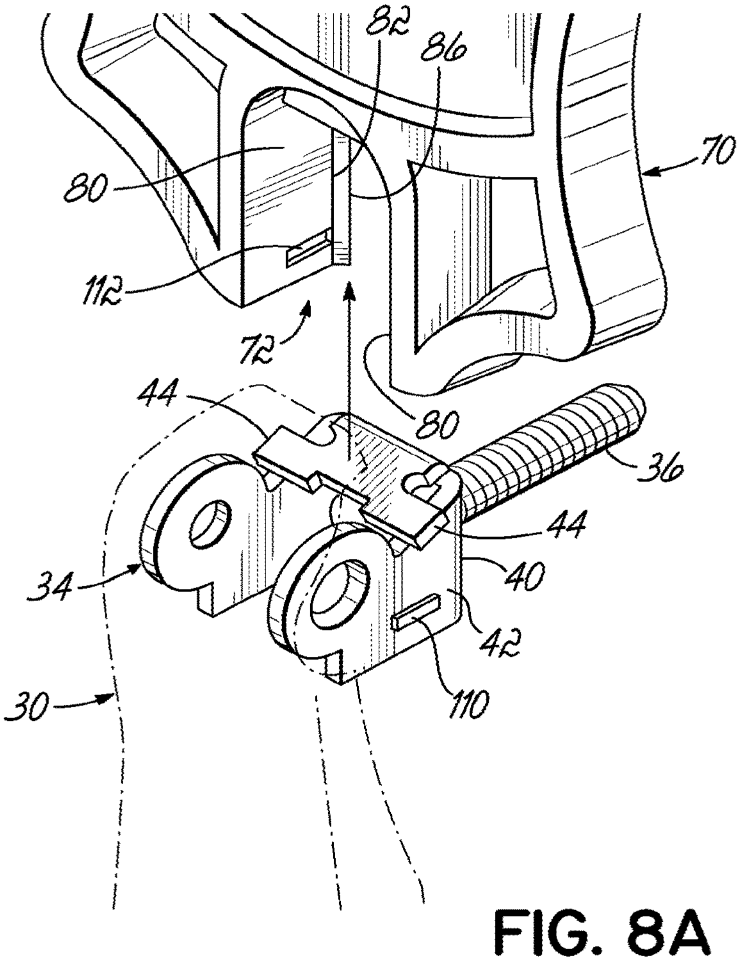
FIG. 8A is a disassembled front perspective view of another embodiment of arm and ear according to the principles of the present invention.
Figure 8B:
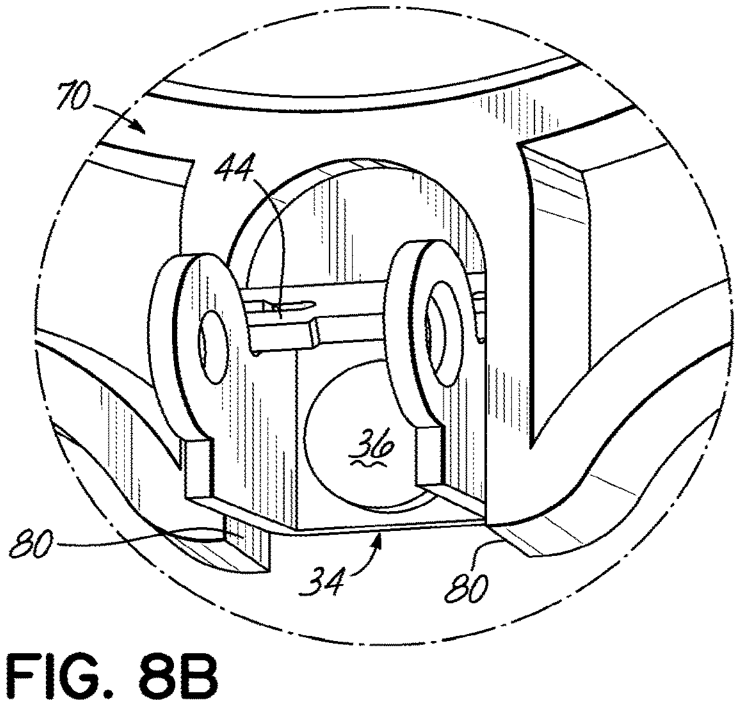
FIG. 8B is an assembled front perspective view thereof.
Figure 9:
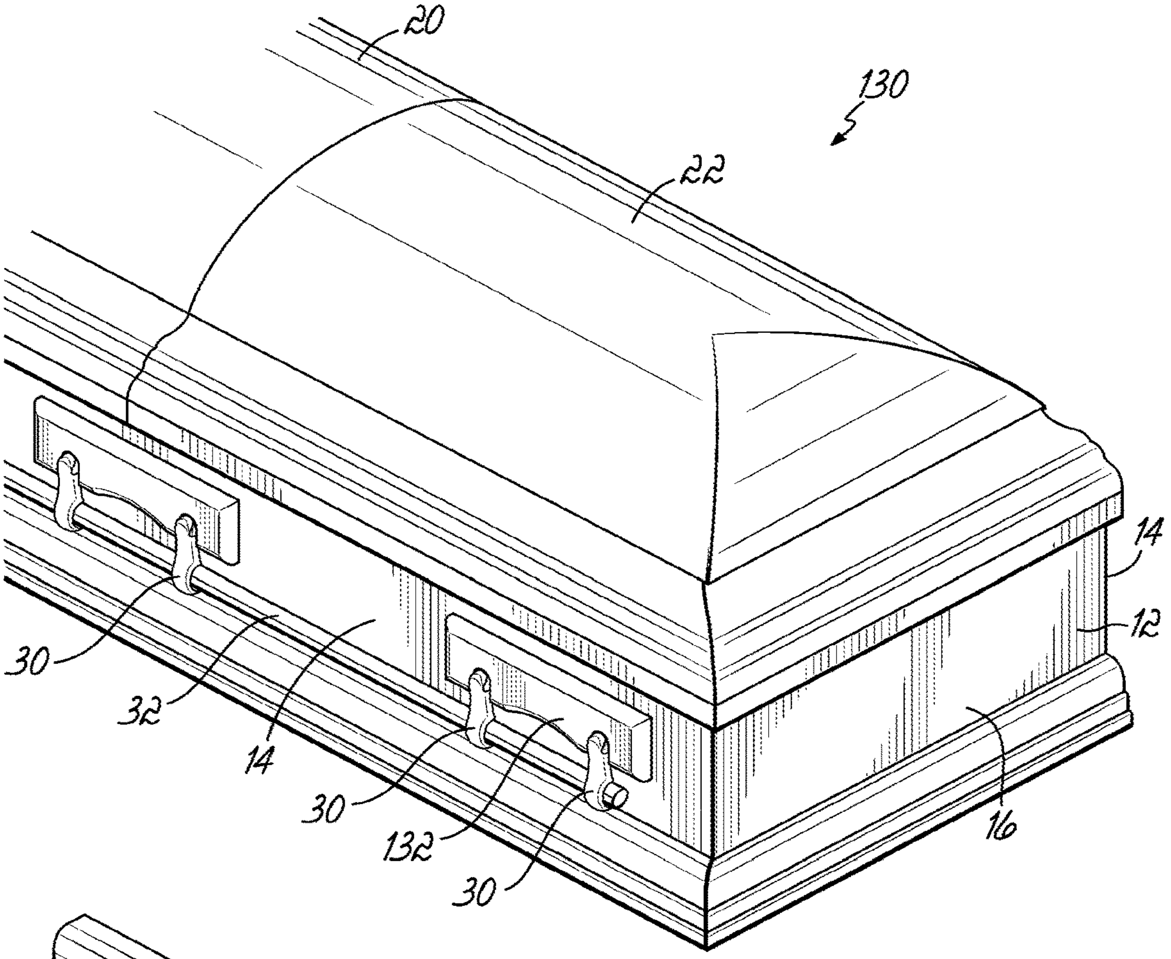
FIG. 9 is a perspective view of another casket according to the principles of the present invention.
Figure 10:
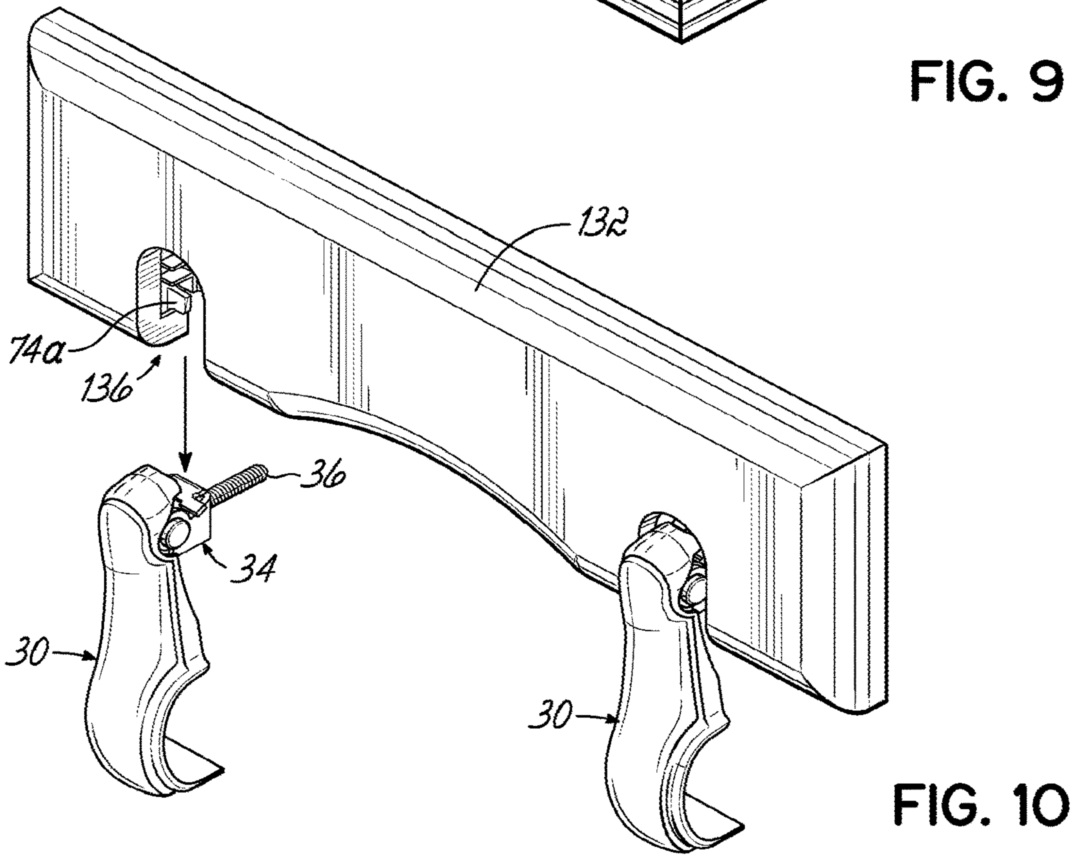
FIG. 10 is an enlarged front perspective view of an arm and ear of FIG. 9.
Figure 11:
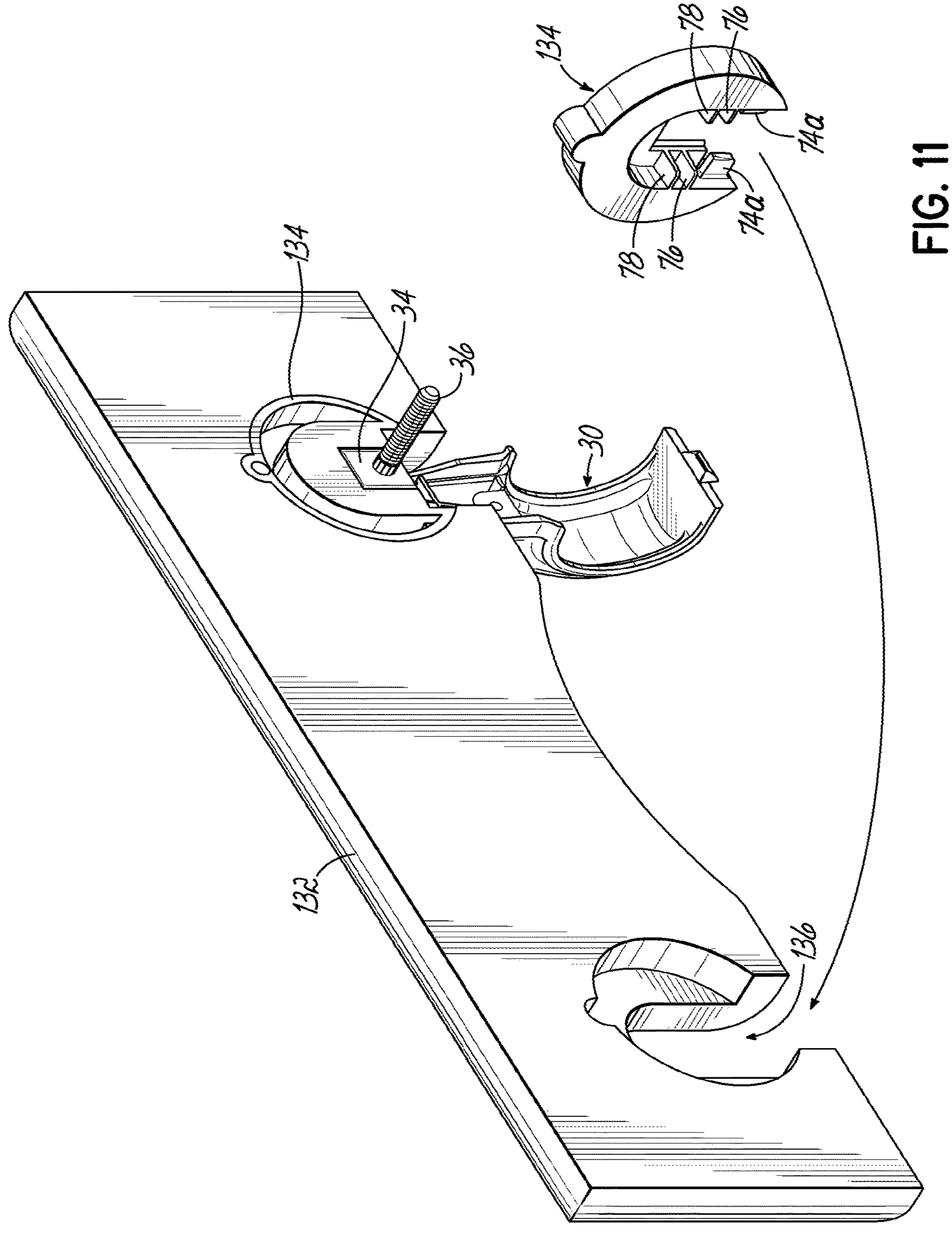
FIG. 11 is a rear partially disassembled perspective view thereof.
Figure 12:
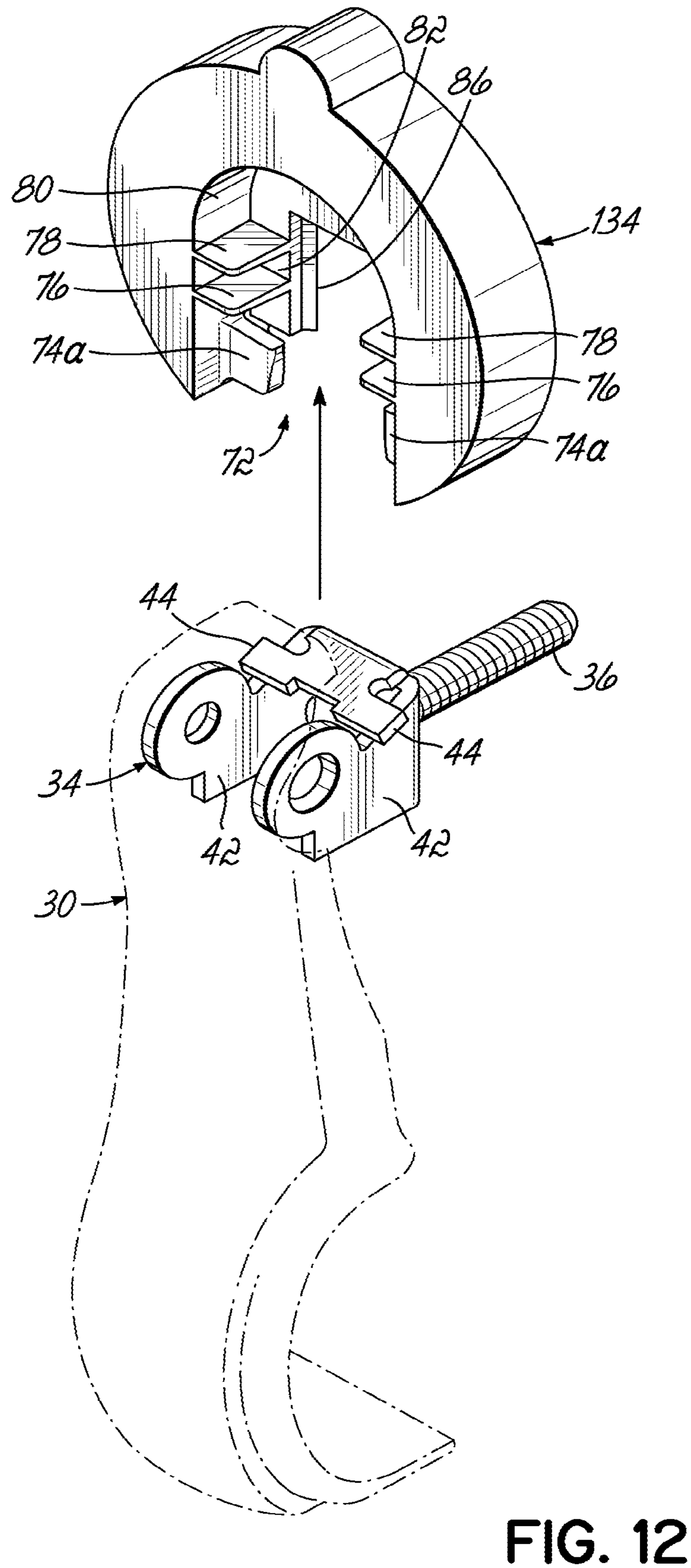
FIG. 12 is an enlarged disassembled front perspective view of the clevis and ear insert of FIG. 11.
Figure 13:
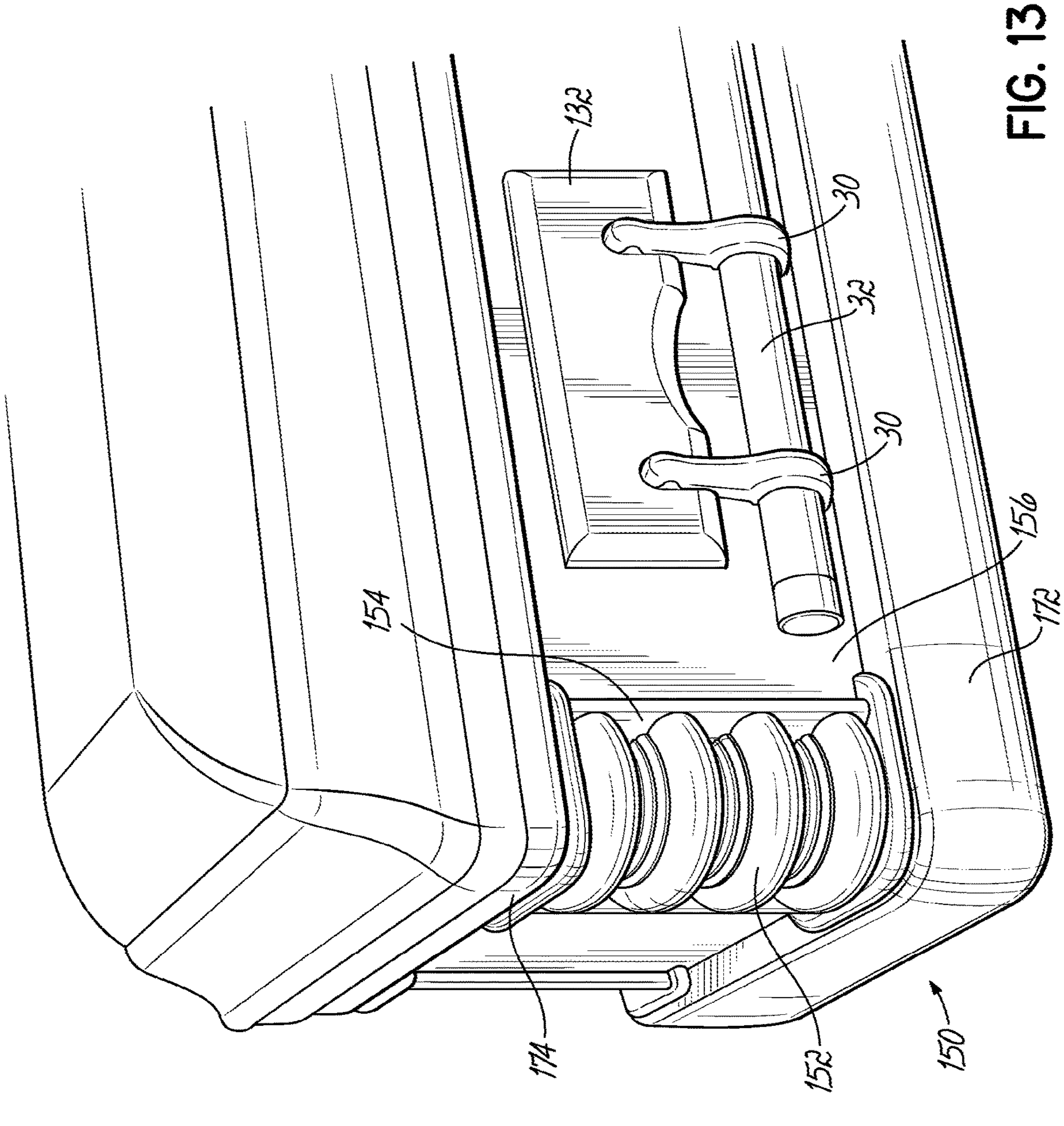
FIG. 13 is a partial perspective view of another casket according to the principles of the present invention.
Figure 14A:
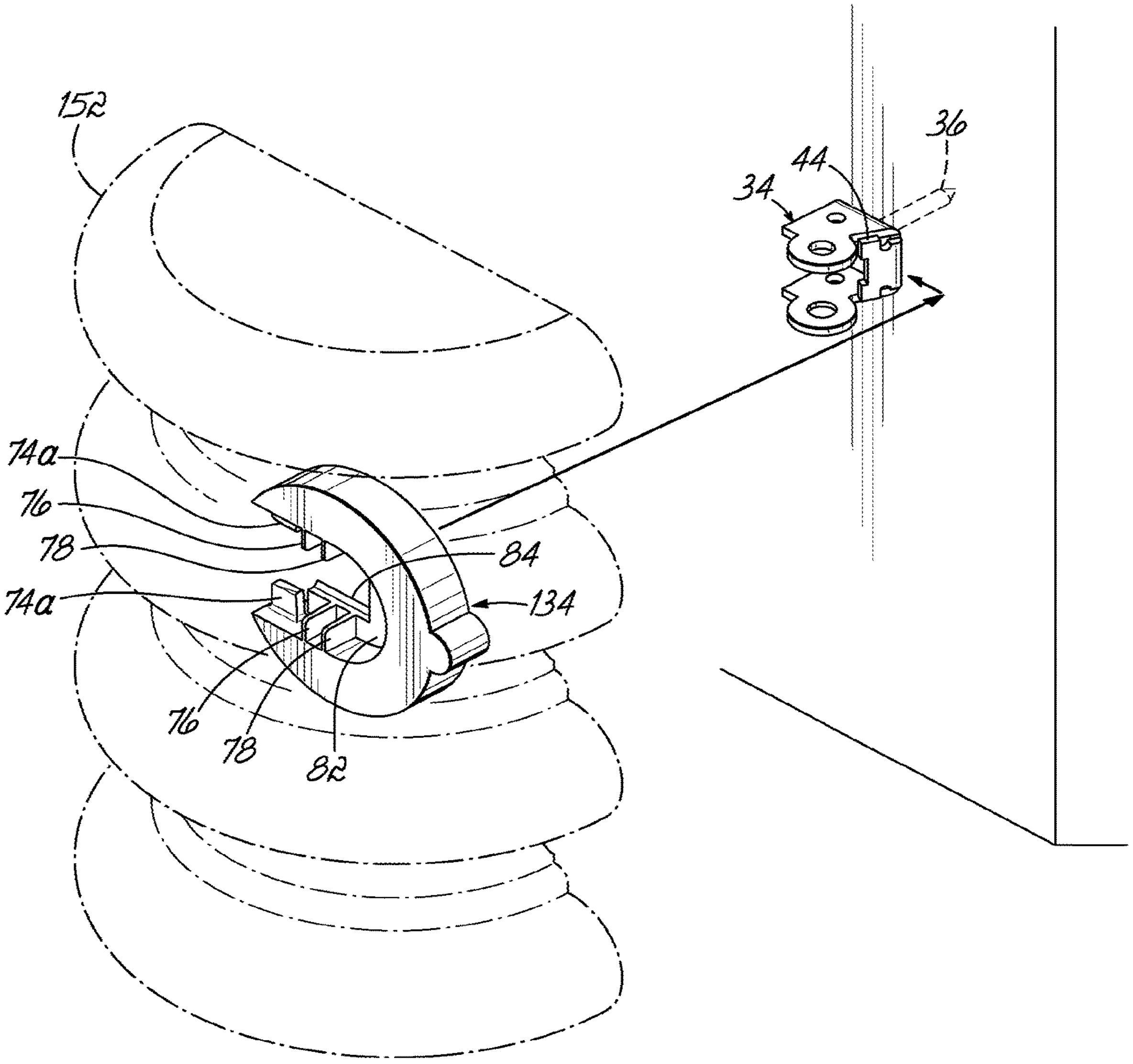
FIG. 14A is an enlarged disassembled front perspective view of the clevis and corner ornament insert of FIG. 13.
Figure 14B:
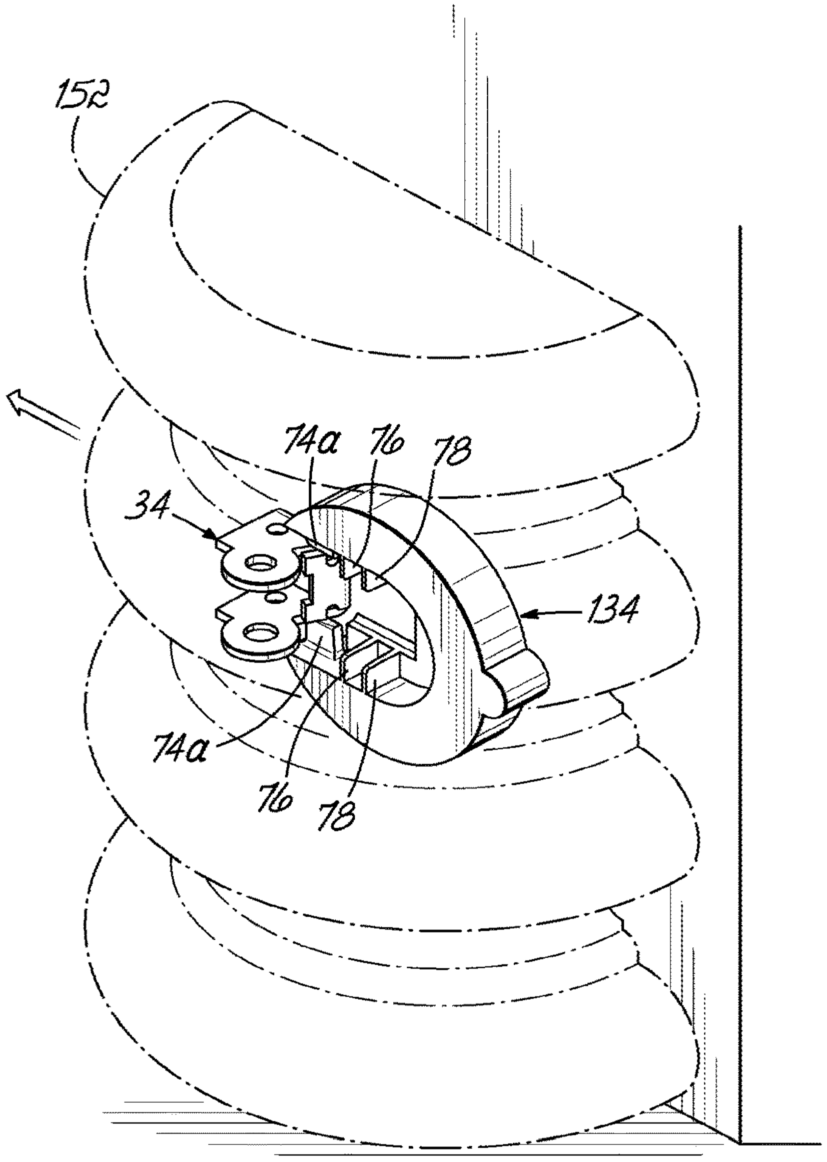
FIG. 14B is a partially assembled front perspective view thereof.
Figure 14C:
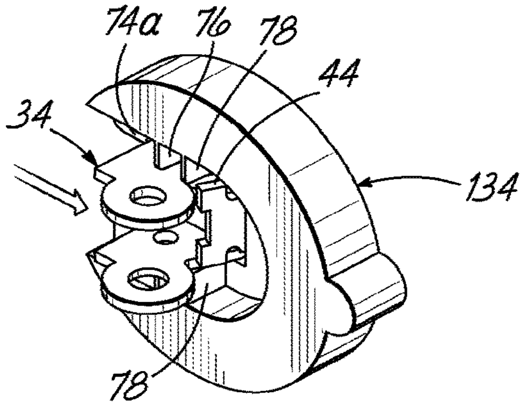
FIG. 14C is a completely assembled front perspective view thereof.
Figure 15A:
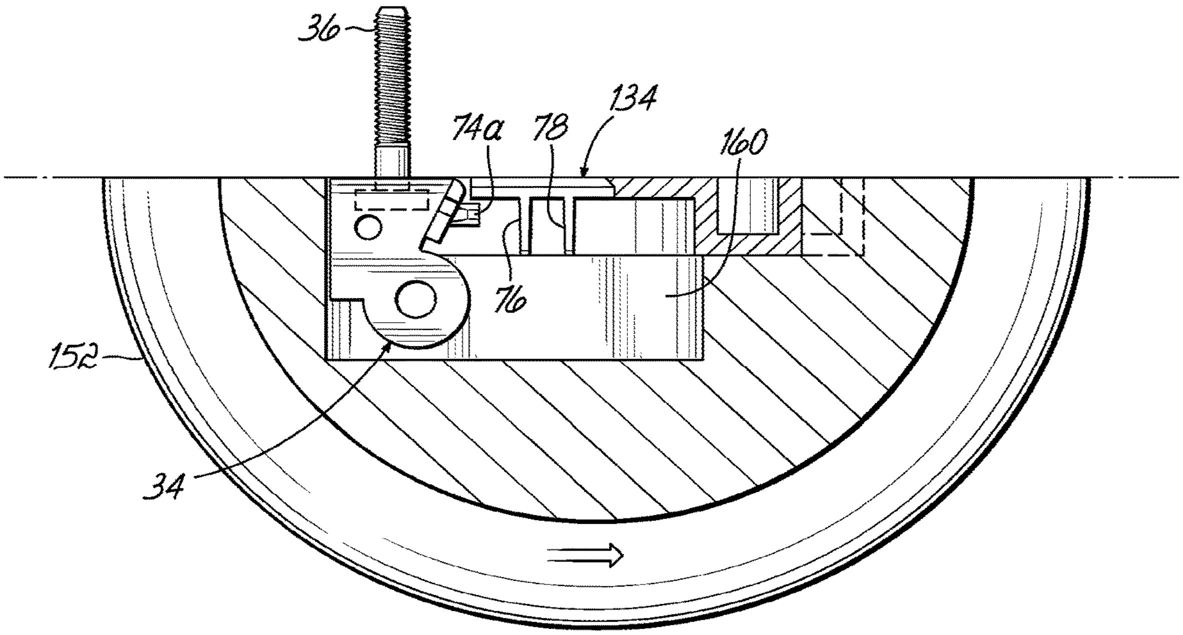
FIG. 15A is a cross-sectional view of FIG. 14B.
Figure 15B:
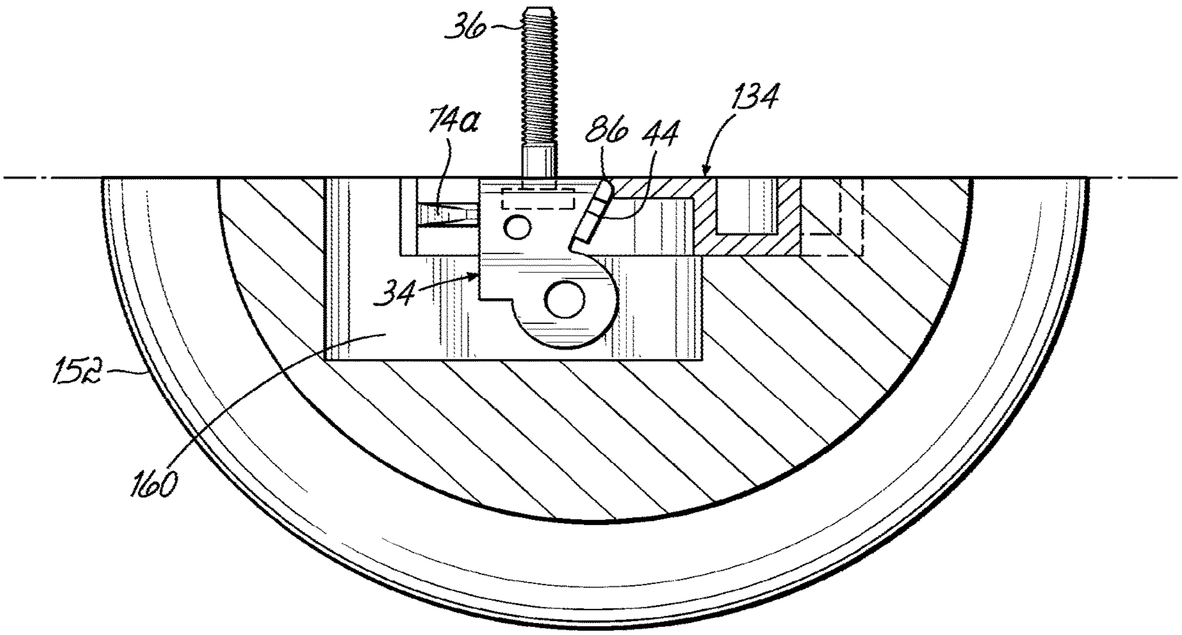
FIG. 15B is a cross-sectional view of FIG. 14C.

As shown in FIGS. 8A and 8B, and with like numbers indicating like elements, each side wall 42 of the clevis 34 has a generally horizontally oriented rib 110 extending laterally outwardly from the side wall 42. Each side 80 of recess 72 in ear 70 has a generally horizontally oriented groove 112 therein. The ribs 110 on the clevis 34 snap into the grooves 112 in the sides 80 of the recess 72 of the ear 70. Installation onto the shell wall is similar to that of FIGS. 4A and 4B, 5A and 5B, 6A and 6B, and 7A and 7B.

Referring now to 9-12, and with like numbers indicating like elements, a casket 130 has wooden ears 132, and a separately fabricated insert 134 of, e.g. plastic, is received in recess 136 in ear 132 for mounting ear 132 on clevis 34. Note that while the insert 134 includes the structure for snugging the ear 132 generally horizontally rearwardly against the casket shell wall, for restraining the ear 132 against generally vertical movement relative to the clevis 34, and for locating the ear 132 laterally relative to the clevis 34 as is shown in FIGS. 5A-5E, any of the other structures described herein can be used in the insert 134.

Referring now to FIG. 13-15B, and with like numbers indicating like elements, a casket 150 has a corner ornament 152 mounted to a wall 154 of the casket shell 156 in a similar manner. Ornament 152 includes a recess 160 in a rear side thereof for receiving the above described insert 134, the only difference being that the insert is rotated 90 degrees relative to that shown in FIGS. 9-12, the reason being that corner ornaments are installed horizontally either from left to right or from right to left on corner walls 154 of casket shells 156, rather than vertically as heretofore described, due to the presence of base mold 172 and top mold 174 on the casket shell. Note that for this application, no arm 30 is required, only the clevis 34 itself. Note also that while the insert 134 includes the structure for snugging the ear 132 generally horizontally rearwardly against the casket shell wall, for restraining the ear 132 against generally vertical movement relative to the clevis 34, and for locating the ear 132 laterally relative to the clevis 34 as is shown in FIGS. 5A-5E, any of the other structures described herein can be used in the insert 134.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. Hardware adapted to be attached to a wall of a casket shell of a casket, the hardware comprising:

a clevis having a pair of side walls and a back wall adapted to be attached to the wall of the casket shell, the clevis having a pair of tabs each of which extends laterally outwardly from a respective one of the side walls of the clevis and each of which is spaced forwardly from the back wall of the clevis, an arm pivoted at an upper end to the clevis, and a decorative ear having a downwardly facing recess in a lower edge thereof and a pair of generally horizontally oriented grooves each of which is located in a respective side of the downwardly facing recess, the decorative ear having a partial back wall section extending laterally inwardly from each side of the downwardly facing recess, each partial back wall section becoming progressively thinner from a point laterally inward of a respective side of the downwardly facing recess to a free edge thereof as measured in a direction generally normal to the wall of the casket shell, each side wall of the clevis having a generally horizontally oriented rib extending laterally outwardly from the side wall, wherein a relative movement between the decorative ear and the clevis generally parallel to the wall of the casket shell to receive the clevis in the downwardly facing recess causes a wedging effect.

2. The hardware of claim 1, wherein initial downward movement of the decorative ear relative to the clevis causes the partial back wall section to pass between the clevis tabs and the casket shell wall, wherein further downward movement cause the wedging effect of the clevis tabs on the partial wall sections for snugging the decorative ear generally horizontally rearwardly against the casket shell wall, and wherein yet further downward movement causes the ribs on the clevis to snap into the grooves in the decorative ear for restraining the decorative ear against generally vertical movement relative to the clevis and for locating the decorative ear laterally relative to the clevis, wherein the decorative ear is fabricated as a unitary one-piece part.

3. The hardware of claim 1, wherein the decorative ear is fabricated of plastic.

* * * * *